United States Patent

Zuercher, Jr.

[11] 3,870,440
[45] Mar. 11, 1975

[54] HERMETICALLY SEALED COMPRESSOR SUCTION TUBE ASSEMBLY

[75] Inventor: Edward A. Zuercher, Jr., Louisville, Ky.

[73] Assignee: General Electric Company, Louisville, Ky.

[22] Filed: Mar. 11, 1974

[21] Appl. No.: 449,920

[52] U.S. Cl. .................................. 418/248, 417/902
[51] Int. Cl. ............................................. F04b 17/00
[58] Field of Search ...... 418/248; 417/952; 285/158

[56] References Cited
UNITED STATES PATENTS

| | | | |
|---|---|---|---|
| 2,447,259 | 8/1948 | Lucke | 285/158 |
| 2,764,427 | 9/1956 | Andrus | 285/158 X |
| 3,209,991 | 10/1965 | Sauber | 417/902 X |
| 3,618,990 | 11/1971 | Falke | 285/158 X |
| 3,767,334 | 10/1973 | Rinehart | 418/248 |

Primary Examiner—C. J. Husar
Assistant Examiner—Leonard Smith

[57] ABSTRACT

A hermetic compressor unit comprising a hermetic casing containing a compressor including a cylindrical block having an arcuate surface engaging the inner surface of the casing and a suction tube assembly for connecting the compressor to a refrigeration system. The suction tube assembly comprises a steel tubular connector having a reduced end portion providing a flange. A ring member having a higher ductility than steel is located on the steel connector flange. A steel tubular fitting includes an end portion press fit into a suction passage in the block and a shoulder portion engaging and compressing the ring member to mechanically seal the compressor casing and suction tube assembly to the compressor.

2 Claims, 3 Drawing Figures

PATENTED MAR 11 1975 3,870,440

HERMETICALLY SEALED COMPRESSOR SUCTION TUBE ASSEMBLY

BACKGROUND OF THE INVENTION

In the manufacture of hermetic compressors for refrigeration systems, it is necessary to provide a fluid tight connector means for connecting the hermetic compressor unit to the refrigeration system.

Until recent years most of the suction tube assembly connectors for connecting a hermetic compressor in a refrigeration system have been composed of copper or aluminum. When using such materials, the usual brazing and soldering techniques have been available for assuring a fluid tight joint between the copper or aluminum conduit and the steel compressor casing during final connection of the compressor to the system. Presently available hermetic compressors such as the one disclosed in U.S. Pat. No. 3,767,334 by Dean C. Rinehart, assigned to General Electric Company, assignee of the present invention, shows a suction tube assembly employing an aluminum conduit joined to the steel casing and a steel tubular fitting including an end portion press fit into the compressor and a shoulder portion engaging the aluminum conduit. When the copper or aluminum suction tube assembly conduits are brazed or soldered to the steel compressor casing, flux is used to protect the joint from oxidation and to remove any oxides which may form during the brazing or soldering procedure. While the use of flux insures an acceptable fluid tight joint at the compressor casing it also creates an additional step in the manufacturing of the hermetic compressor in that the flux and residue caused by the joining procedure must be completely removed from the casing prior to the final sealing of the compressor.

It is therefore an object of the present invention to provide a flux free connecting system that mechanically seals the compressor casing and the suction tube assembly to the compressor.

SUMMARY OF THE INVENTION

The present invention is particularly directed to an improved hermetically sealed compressor unit assembly adapted to assure a fluid tight connection between the compressor cylinder and the suction tube assembly. In accordance with the illustrated embodiment of the invention, there is provided a hermetic compressor unit comprising a steel casing and a compressor including a cylinder or compressor block which may be press fit or heat shrunk into contact with the casing side wall. The block includes a suction passage opening and the casing is provided with a hole aligned with and larger than the suction passage. A tubular steel connector having a reduced end portion provided with a flange extends into the casing hole to a point adjacent the suction passage opening in the block and is welded to the casing. A tubular ring member having a higher ductility than steel is located on the flange. A tubular steel fitting is driven into the connector and has an end portion press fit into the suction passage and a shoulder portion engaging said ring member to compress the ring member between the flange and the shoulder portion to mechanically seal the compressor casing and the suction tube assembly to the compressor.

DESCRIPTION OF THE PREFERRED EMBODIMENT

Figure 1:
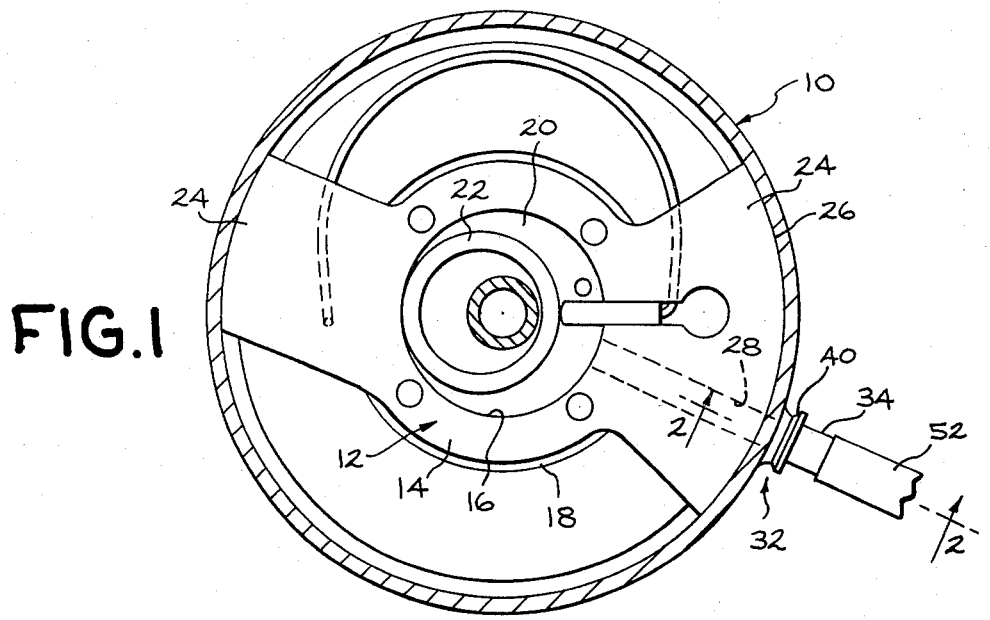
FIG. 1 is a horizontal sectional view of a hermetic refrigerant compressor unit incorporating the present invention.

With reference to FIG. 1 of the drawings, there is illustrated a hermetic rotary compressor unit comprising a cylindrical casing 10 in which there is disclosed a rotary compressor 12. The compressor includes a cylinder block 14 having an inner cylindrical surface 16 which in combination with an end plate 18 and the second end plate (not shown) defines a compressor cylinder 20 containing a rotor 22.

The cylinder block 14 includes diametrically opposed legs or extensions 24 having arcuate surfaces 26 engaging the inner surface of the cylindrical casing wall 10. In the manufacture of such compressors, the cylinder block may be either pressed into the casing or the casing is heat shrunk onto the cylinder block.

Figure 3:
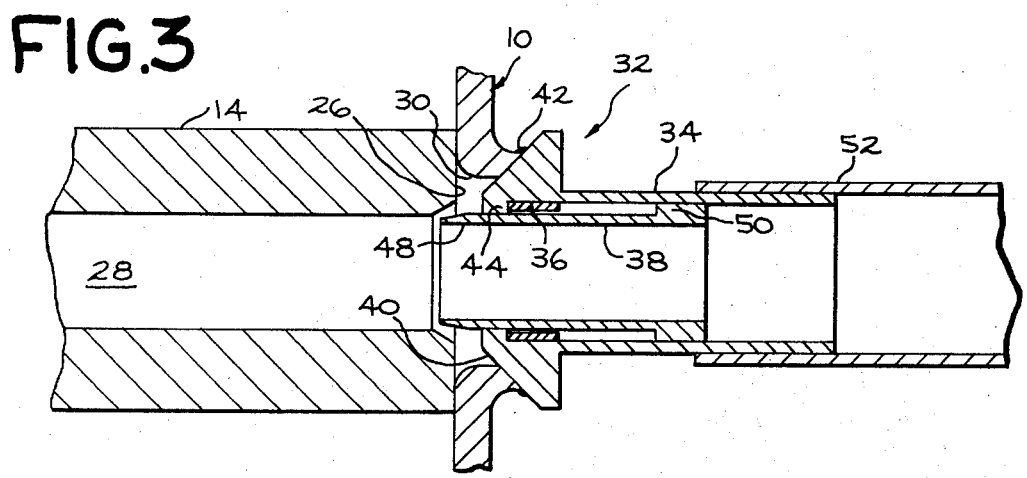
FIG. 3 is a view similar to FIG. 2 illustrating one step in the manufacture of the compressor connector portion.
Figure 2:
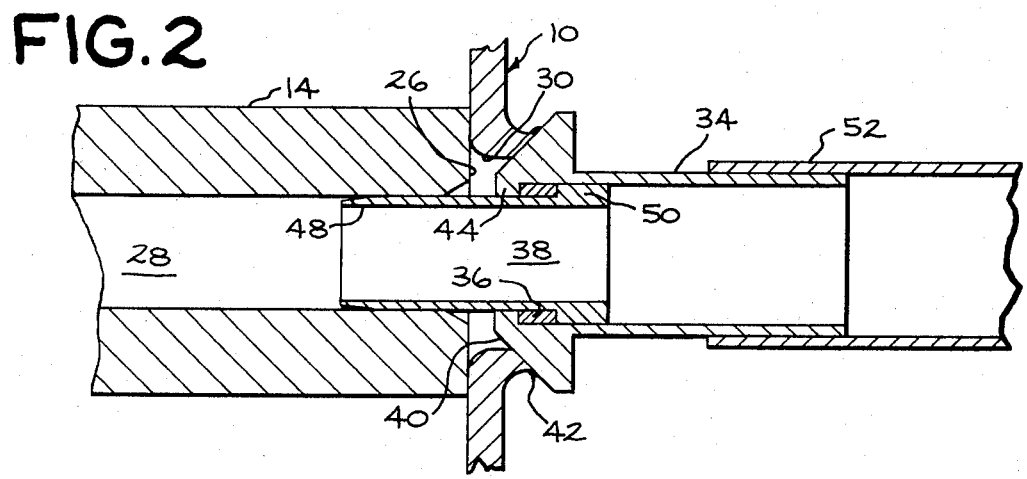
FIG. 2 is an enclarged section view taken along line 2—2 of FIG. 1 illustrating the construction of the connector portion of the unit.

A suction passage 28 extends through the cylinder block from one of the arcuate surfaces 26 and into the compressor cylinder 20. The outer end of this passage, as illustrated in FIGS. 2 and 3 of the drawings, is in axial alignment with a flanged hole 30 in the casing side wall 10. The hole 30 has a somewhat larger diameter than the passage 28. A compressor of this general construction is shown in U.S. Pat. No. 3,568,712 — Rinehart, to which reference is made for a more detailed description of its construction and operation.

In accordance with the present invention means are provided for connecting the suction line of a refrigeration system to the suction passage 28. To this end in one embodiment of the invention, as shown in FIGS. 2 and 3, there is provided a suction tube assembly 32 which comprises a tubular steel connector or conduit 34 secured to the compressor casing 10, a tubular ring member 36 and a tubular steel fitting 38. The steel connector 34 has a reduced end portion 40 extending into or through the hole 30 to a point adjacent the arcuate surface 26 of the compressor cylinder block 14. The end portion 40 is preferably of frustum configuration that permits the end portion of the connector to project into the hole 30 and facilitate alignment of the connector 34 relative to the hole 30 and passageway 28. The end portion 40 of the connector 34 is welded to the casing 10 to the flange portion of the hole 30 as indicated at 42 to form a fluid tight seal between the casing 10 and connector 34. The means provided in the present embodiment to mechanically secure the connector 34 to the compressor suction passage 28 include a circumferentially disposed flange 44 located adjacent the end portion 40 of connector 34. The tubular ring member 36 is arranged on the flange 44. The member 36 has been chosen from the group of metals having a higher ductility than steel. While in the present embodiment aluminum is used to fabricate the member 36, it should be understood that other ductile materials relative to steel may be used. The tubular steel fitting 38 is then employed to mechanically connect the connector 34 to the passage 28. This tubular fitting 38 is inserted into the connector 34 and includes a reduced end portion 48 dimensioned to be press fit into the passage 28 and a shoulder portion 50 that projects radially outwardly from the fitting 38 to a position in axial alignment with the flange 44 and member 36 thereon. As the end portion 48 of fitting 38 is driven into press fit relation with the passageway 28, to effect a fluid tight seal, the shoulder portion 50 engages the relatively ductile member 36 to compress it between the flange 44 and the shoulder 50 to form a fluid tight seal in the passage 28 area and in the casing connector area to mechanically seal the compressor casing 10 and suction tube 32 assembly to the compressor 12.

For assembly to the suction line 52 of a refrigeration system, the end of the line 52 is slip fit onto the connector 34 and adhesively bonded thereto by use of a suitable adhesive such as an epoxy cement. The use of a steel connector 34 permits the use of a welding procedure in attaching the connector 34 to the steel casing 10 that is relatively inexpensive and provides a reliable fluid tight seal. Further, the use of a steel connector 34 provides a compressor that is adaptable for use with either an aluminum or copper refrigeration system in that the adhesive joint is compatible with both systems.

While there has been shown and described a specific embodiment of the invention, it will be understood that it is not limited thereto and it is intended by the apended claims to cover all such modifications as fall within the true spirit and scope of the invention.

I claim:
1. A hermetic compressor unit comprising:
a casing including a side wall;
a compressor including a cylinder block positioned in said casing and having an outer surface adjacent the inner surface of said casing wall;
a suction passage in said block opening into said outer surface;
said casing having an opening aligned with and larger than said passage;
a suction tube connector having a reduced end portion extending into said opening in axial alignment with said suction passage;
a circumferentially disposed flange formed on the inner surface of said tube connector adjacent said reduced end portion;
a tubular ring member being of greater ductility than engaging parts arranged on said flange; and
a tubular fitting having an end portion press fit in said passage and a shoulder portion projecting over said flange for engaging and compressing said ring member between said flange and said shoulder to seal the casing and suction tube connector to the compressor cylinder block.

2. A compressor according to claim 1 wherein said suction tube connector and said tubular fitting is steel, and said tubular ring member is aluminum.

* * * * *